Jan. 6, 1953     H. PULS     2,624,295
BAKING MACHINE
Filed Jan. 4, 1949     2 SHEETS—SHEET 1
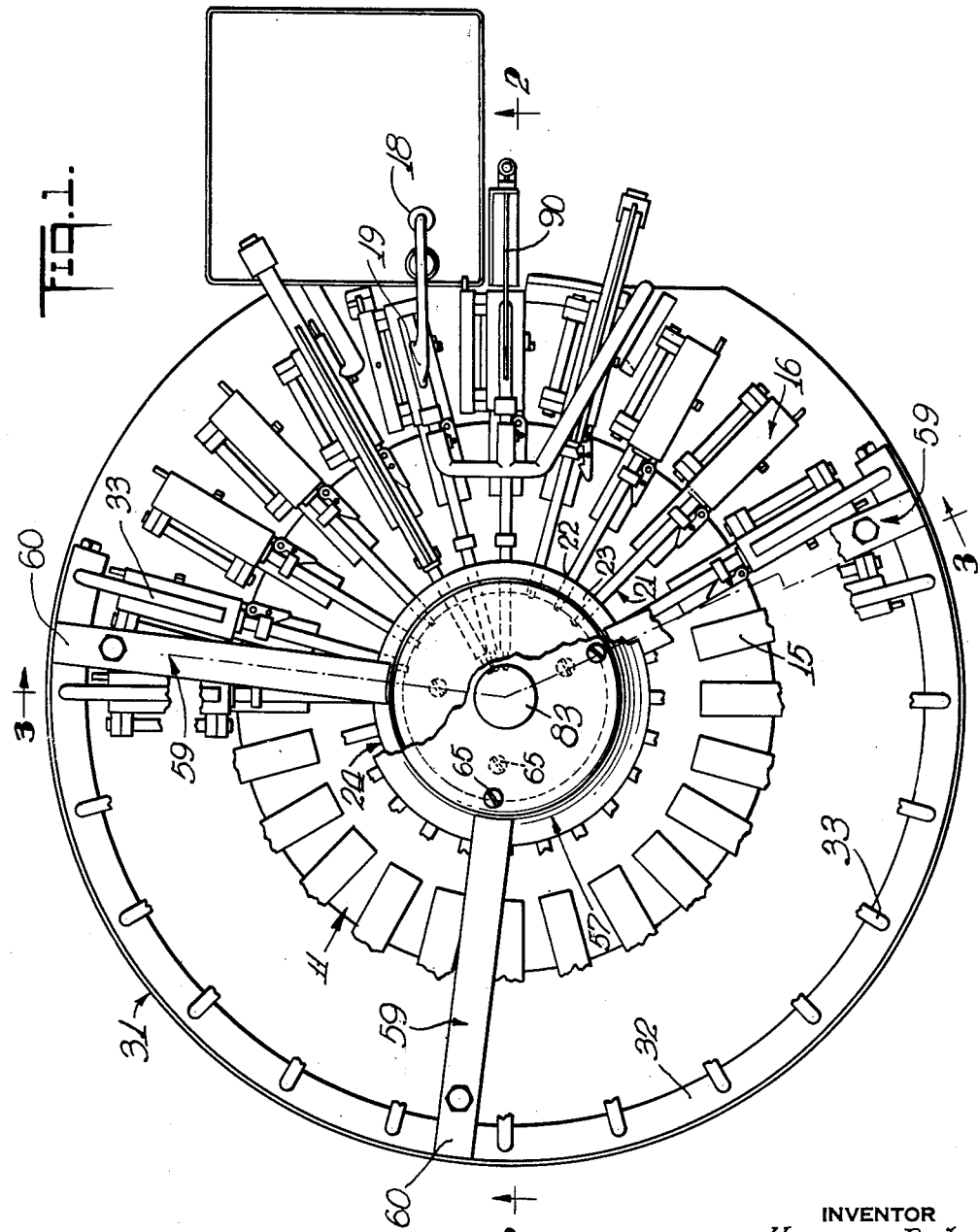
INVENTOR
*Herman Puls*
BY
*Dean Fairbank & Hirsch*
ATTORNEYS Jan. 6, 1953　　　　　　　　　H. PULS　　　　　　　　　2,624,295
BAKING MACHINE
Filed Jan. 4, 1949　　　　　　　　　　　　　　　　　　　2 SHEETS—SHEET 2
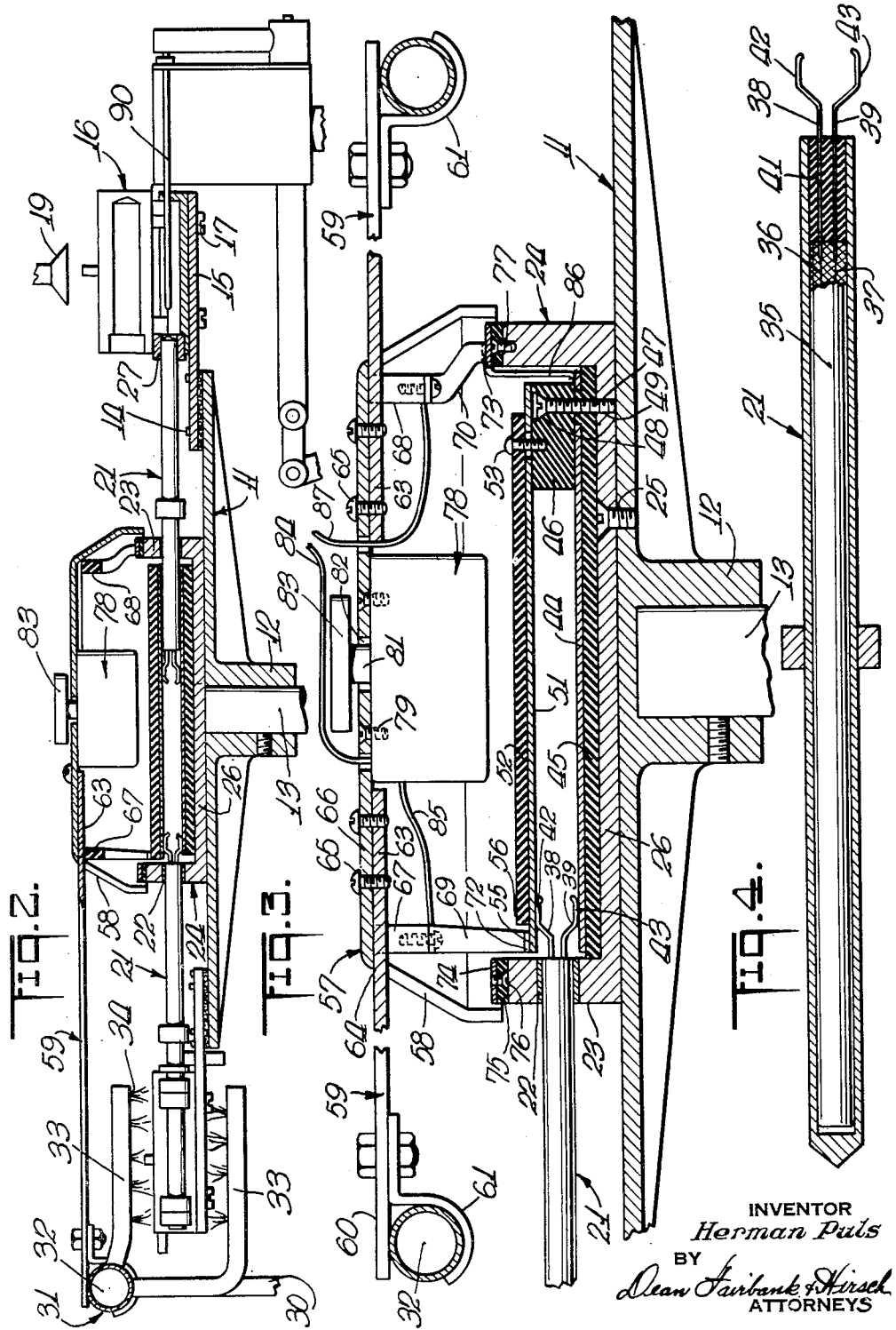
INVENTOR
*Herman Puls*
BY
*Dean Fairbank & Hirsch*
ATTORNEYS Patented Jan. 6, 1953

2,624,295

UNITED STATES PATENT OFFICE 2,624,295

BAKING MACHINE

Herman Puls, New York, N. Y.

Application January 4, 1949, Serial No. 69,192

4 Claims. (Cl. 107—4)

The present invention is concerned with the art of baking and more particularly with heating means and the control appurtenances thereof, and is especially useful with, though not limited to, a machine that automatically forms, bakes and discharges tubes of pastry.

Unless the pastry tube can be formed, baked and removed from the machine at a relatively high rate of speed with a minimum of handling and waste, the cost of manufacture of the finished product may be too high to admit of sale at popular prices.

Where heat is applied only to the exterior of the dough from which the tube is formed, the outer surface alone of the latter will be seared or hardened thereby acting as an insulator to reduce the heat passing through the thickness of the wall of the tube. Thus if the heat is applied for a sufficient length of time to bake the entire thickness of the tube wall, the outer surface thereof may be scorched or burned, and if heat is applied only for a sufficient length of time properly to bake the outer surface of the tube wall, the inner portion of the tube wall may be underbaked or even remain doughy, unpalatable and indigestible.

The finished product may thus be unsatisfactory assuming that it is not too brittle on the one hand or too adhesive on the other to admit of removal intact from the machine.

It is accordingly among the objects of this invention to provide an automatic baking machine for uniformly applying heat to the inner and outer walls of the tube for baking the same properly throughout its entire length and thickness.

Another object is to provide a machine for automatically forming such tubes, baking the latter and thereupon discharging the same, which machine is compact and rugged in construction, which functions with a minimum number of operating parts none of which is delicate or apt to become out of order, which machine is capable of continuous operation at a relatively high speed for long periods without attention and the working parts of which are readily accessible for maintenance and repair and the cost of upkeep of which is low.

While the invention in its broader aspects relates to the baking of tubes of pastry by applying heat simultaneously to both the inner and outer surfaces of the walls thereof, a specific embodiment is concerned with a machine for automatically forming, baking and discharging such baked tubes and while the forming and discharging of such tubes may be performed in other manners, it is preferred to utilize in such specific embodiment those elements shown and described in my co-pending application Serial No. 780,093, dated October 15, 1947, now Patent No. 2,563,866, issued August 14, 1951.

According to one aspect of the invention a plurality of molds is provided each having a horizontal plunger rod or core associated therewith slidable therein to form the pastry tube. Means are provided to heat the plunger rods and the exterior of the molds whereby both the entire length and thickness of the pastry tubes will be uniformly baked.

According to another aspect of the invention a plurality of operating stations are provided automatically to form pastry tubes, to apply heat to both the interior and exterior of such tubes and to discharge such uniformly baked tubes from the machine.

In a specific embodiment of the machine herein chosen to illustrate my invention the molds are radially arranged on a rotatable circular table, straddled by an oven to heat the exterior of said molds. The plunger rods are radially arranged on said table, each slidably mounted at one end in an associated mold and at its other end in one of a plurality of bearing openings in the upstanding rim of a circular hub affixed to the center of the table. Each of the plunger rods is hollow and desirably has an electric heating element positioned therein, the terminals of which have a pair of spaced contact fingers projecting from the inner end of the rod longitudinally thereof.

The contact fingers respectively frictionally engage a pair of spaced parallel contact plates which are affixed to the central portion or floor of said hub, insulated therefrom and from each other and means are provided to connect a source of current to said contact plates whereby current may be supplied through said contact fingers to each of said heating elements to energize the latter.

In the accompanying drawings in which is shown one of various possible embodiments of the several features of the invention, Fig. 1 in a plan view of the machine with parts broken away, Fig. 2 is a sectional view on a larger scale taken along line 2—2 of Fig. 1, Fig. 3 is a view similar to Fig. 2 taken along line 3—3 of Fig. 1, and Fig. 4 is a longitudinal sectional view on a larger scale of one of the plunger rods.

Referring now to the drawings, the machine comprises a table 11 desirably circular as shown having a hub 12 positioned on the upper end of a vertical shaft 13 and securely affixed thereto, means (not shown) being provided intermittently to rotate said shaft and the table thereon. Although any convenient mechanism could be used for rotating the table the intermittent drive mechanism shown and described in my co-pending application above identified is desirably used.

Affixed to table 11 near the periphery thereof by screws 14 and equally spaced thereon are a plurality of support arms 15, extending radially of and protruding beyond the periphery of said table 11, each of the protruding ends of radiating arms 15 carrying a mold 16 affixed thereto by screws 17.

To form a tube from the dough with which the molds are charged, desirably from a pump 18, the outlet 19 of which is positioned over said molds so as to be in the path of movement thereof as table 11 is intermittently advanced, a hollow horizontal plunger rod or core 21 is provided for each of the molds. Each of the plunger rods 21 is slidably mounted at one end in the corresponding one of a plurality of bearing openings 22 in the upstanding rim 23 of a circular hub 24 which hub rises from and is affixed to the center of table 11 by screws 25, which extend through the floor 26 of the hub. The other end of each of the plunger rods 21 is slidably mounted in a bearing bushing 27 of its associated mold 16.

In order that the forming, baking and removal of the baked tubes be automatically performed, a plurality of operations are performed which includes the opening of the molds 16 in sequence so that they may be filled with a predetermined amount of dough from pump 18, the closing and locking of such molds 16, the introduction of the plunger rods 21 into the charged molds to form the tubes, the locking of the plunger rods in said molds, and after baking, the unlocking of the plunger rods and the molds, the removal of the plunger rods 21, the opening of the molds and the removal of the baked pastry tubes therefrom which latter operation is desirably performed by a lifting pin 90.

As such operations and the associated mechanism have been described in detail in my co-pending application above identified they will only be described herein sufficiently for a clear understanding of the present invention.

To apply heat to the exterior of the molds 16 and consequently to the outer wall of the tube therein, an oven 31 is provided which in one specific embodiment of the present invention preferably comprises an arcuate gas pipe 32 extending about an arc defined by the outer end of the molds and affixed to the frame of the machine by standards 30.

Extending radially inward from pipe 32 are a plurality of pairs of gas outlets 33, each pair forming a yoke. The pairs of outlets 33 are positioned along pipe 32 so as to be spaced from each other by a distance equal to that between the outer ends of consecutive molds. Thus after each intermittent movement of table 11 by the intermittent drive mechanism therefor, one of said pairs of outlets 33 will be vertically aligned with an associated mold to straddle the same. The outlets each having a plurality of openings 34 therein positioned so that the gas flame therefrom will play upon the top and bottom of the mold for equal distribution of heat thereto.

It is of course to be understood that other types of ovens could be used such as electric ovens, it being important only that the heat be distributed equally over the mold to provide even baking of the contents thereof.

To apply heat to the inner wall of the tube in the mold, a heating element 35 is provided, desirably a Nichrome resistance, although other types may be used, positioned in the bore of hollow plunger rod 21. Each of the terminals 36, 37 of the heating unit has a resilient contact finger 38 and 39 connected thereto respectively, which contact fingers are insulated from each other and anchored at one end as at 41 in the bore of the plunger rod 21 at the inner end thereof. Contact fingers 38 and 39 preferably extend longitudinally of said plunger rod 21 and are desirably vertically aligned as shown with the contact areas 42, 43 of the fingers parallel to each other and extending laterally inward from the rim 23 of hub 24.

Area 43 of contact finger 39 and area 42 of contact finger 38 are in frictional engagement respectively and resiliently urged against contact plates 44 and 51 which are desirably circular as shown and which function as slip rings. Contact plate 44 is positioned on a disc 45 of non-conducting material such as fibre or the like interposed between contact plate 44 and floor 26 of the hub 24.

A plurality of spacer blocks 46 of insulating material are positioned on the top surface of plate adjacent the periphery thereof. By means of a vertical screw 47 extending through a countersunk hole in each of the blocks, through plate 44 and disc 45 and threaded into a corresponding opening 49 in floor 26, the contact plate 44 is securely retained in place parallel to floor 26. Contact plate 51 is positioned on blocks 46, extending parallel to and spaced from contact plate 44, and is also insulated therefrom and from said hub 24. Contact plate 51 has an insulating disc 52 of fibre or the like positioned on the upper surface thereof, said contact plate 51 and said disc 52 being affixed to said blocks 46 by screws 53 threaded into corresponding openings in said blocks.

The diameter of said contact plate 51 is slightly greater than that of disc 52 so that the peripheral rim 55 of the former extends beyond the peripheral rim 56 of the latter.

With the construction heretofore described as plunger rods 21 are reciprocated, the contact fingers 38 and 39 will slide between plates 44 and 51 with contact areas 42 and 43 in frictional engagement therewith respectively.

Positioned over hub 24 is a support member 57 desirably cup-shaped as shown with the depending wall 58 thereof straddling the rim 23 of hub 24. To retain member 57 in place, a plurality of horizontal bars 59 are provided, illustratively three as shown, each affixed at its outer end 60 to pipe 32 by clamp 61, with its inner end 63 extending through a slot 64 in wall 58 of member 57 and affixed to the underface of the top 66 of member 57 by screws 65.

Affixed to the underface of the top 66 of member 57 are insulating blocks 67 and 68, each of which carries a downwardly extending resilient contact finger 69 and 70 respectively. The end 72 of the former is in frictional engagement with the peripheral rim 55 of contact plate 51 and the end 73 of the latter is in frictional engagement with a contact ring 74 affixed by screws 76 to an insulating ring 75 which ring is affixed to the rim 23 of hub 24 by screws 77.

To regulate the current flow through heating elements 21 and thereby control the temperature thereof, a variable resistor 78 is provided affixed by screws 79 to the undersurface of the top of member 57 and having a control shaft 81 extending through an opening 82 in member 57 and mounting a control knob 83.

To form a complete electrical circuit, contact plate 44 is connected by lead 86 to contact ring 74, and contact finger 69 is connected by lead 85 to variable resistor 78, ring 74 and resistor 78 being connected to a source of current by leads 87 and 84 respectively. Thus, the circuit for the heating elements is from lead 84 through resistor 78, lead 85 and contact finger 69, through contact plate 51 and contact fingers 38, through the heating elements 35, then through contact finger 39, contact plate 44, lead 86, contact ring 74 and contact finger 70 to lead 87.

With the construction above described when the plunger rods are moved into their associated molds which desirably have been charged with sufficient dough so that it will be slightly compressed, a tube of uniform wall thickness will be formed with the outer and inner faces of the wall pressing against the mold wall and against the plunger rod respectively. When heat is supplied simultaneously to both the outer and inner faces of the tube, they will quickly be seared or case hardened, forming a seamless, substantially non-porous shell and hence the gases formed by the evaporation of the water in the dough will form a porous cellular structure between such case hardened faces. Thus the resultant product will be crisp and crunchy and the hardened faces of the wall will give it relatively greater strength so that it may be handled and packed without likelihood of cracking or breaking.

Although the construction herein described is for making tubes that are substantially circular in cross section, it is of course to be understood that it is within the scope of the invention to modify the shape of the mold cavity and plunger rod so that the tubes may be square, oval, elliptical or the like and the word "tube" as used in the specification and claims includes all of such shapes.

As many changes could be made in the above construction, and many apparently widely different embodiments of this invention could be made without departing from the scope of the claims, it is intended that all matter contained in the above descripton or shown in the accompanying drawings shall be interpreted as illustrative and not in a limiting sense.

Having thus described my invention, what I claim as new and desire to secure by Letters Patent of the United States is:

1. In a machine of the character described for baking tubes of pastry, said machine comprising a frame, a circular table rotatably mounted on said frame, and a plurality of molds for dough affixed to said table and radially arranged on the periphery thereof; the combination therewith of a circular hub member affixed to the center of said table and having an upstanding rim on the periphery thereof, a plurality of radially arranged hollow plunger rods associated respectively with each of said molds and slidable into and out of said molds to form a tube from the dough therein, each of said plunger rods bearing at one end in a corresponding one of a plurality of transverse openings extending through said upstanding rim and spaced therearound, means to apply heat to the outer wall of the tubes in said molds, a pair of contact plates rigid with the floor of said hub, insulated therefrom and from each other, said plates lying parallel to the floor of said hub and being spaced from each other, said rods being movable between said plates and an electric heating unit positioned in the bore of each of said hollow plunger rods to apply heat to the inner walls of the tubes in said molds, each of said heating elements having a pair of spaced contact fingers extending inwardly of the rim of said hub and frictionally and resiliently engaging opposed faces of said spaced plates respectively whereby when a source of current is applied to said contact plates said heating elements will be energized.

2. The combination set forth in claim 1 in which contact means are provided affixed to said frame and electrically connected to said contact plates respectively whereby when a source of current is applied to said contact means said heating elements will be energized.

3. The combination set forth in claim 1 in which a contact ring is provided affixed to the rim of said hub, insulated therefrom and electrically connected to one of said contact plates and a pair of contact means are provided affixed to said frame frictionally and resiliently engaging the other of said plates and said contact ring respectively whereby when a source of current is applied to said contact means, said heating elements will be energized.

4. The combination set forth in claim 1 in which a contact ring is provided, affixed to the rim of said hub, insulated therefrom and electrically connected to one of said contact plates, and a support member is provided rigid with the frame, and positioned over said hub, a pair of resilient contact fingers are affixed to said support member and insulated therefrom, one of said contact fingers engaging said contact ring and the other of said contact fingers engaging the upper face of the other of said contact plates whereby when a source of current is applied to said contact fingers said heating elements will be energized.

HERMAN PULS.

REFERENCES CITED

The following references are of record in the file of this patent:

UNITED STATES PATENTS

| Number | Name | Date |
| --- | --- | --- |
| 1,418,195 | Miglietta | May 30, 1922 |
| 1,476,122 | Walker | Dec. 4, 1923 |
| 1,575,302 | Winder | Mar. 2, 1926 |
| 1,719,931 | Hall | July 9, 1929 |
| 1,744,407 | Paterson et al. | Jan. 21, 1930 |
| 1,798,515 | Bates | Mar. 31, 1931 |
| 1,899,302 | Balton | Feb. 28, 1933 |